United States Patent [19]
Hock

[11] Patent Number: 5,876,062
[45] Date of Patent: Mar. 2, 1999

[54] AIRBAG INFLATOR WITH DIRECT ELECTRICAL IGNITION FOR SMALL SIZED GAS GENERANT BODIES

[75] Inventor: Christopher Hock, Uintah, Utah

[73] Assignee: Autoliv ASP, Inc., Ogden, Utah

[21] Appl. No.: 903,040

[22] Filed: Jul. 29, 1997

[51] Int. Cl.[6] .................................................. B60R 21/26
[52] U.S. Cl. .......................................... 280/736; 280/741
[58] Field of Search ................................... 280/735, 736, 280/741; 102/202.3

[56] References Cited

U.S. PATENT DOCUMENTS

| | | | |
|---|---|---|---|
| 3,532,358 | 10/1970 | Selwa et al. .............................. | 280/150 |
| 3,532,360 | 10/1970 | Leising et al. ........................... | 280/150 |
| 3,606,377 | 9/1971 | Martin .............................. | 280/150 AB |
| 3,724,870 | 4/1973 | Kurokawa et al. .............. | 280/150 AB |
| 3,797,854 | 3/1974 | Poole et al. ............................. | 280/741 |
| 3,871,684 | 3/1975 | Staudacher ....................... | 280/150 AB |
| 4,316,874 | 2/1982 | Kasama et al. .......................... | 280/741 |
| 4,547,342 | 10/1985 | Adams et al. ........................... | 422/166 |
| 4,561,675 | 12/1985 | Adams et al. ........................... | 280/734 |
| 5,230,532 | 7/1993 | Blumenthal et al. ................... | 280/741 |
| 5,337,674 | 8/1994 | Harris et al. ............................ | 102/530 |
| 5,419,578 | 5/1995 | Storey et al. ........................... | 280/741 |
| 5,429,387 | 7/1995 | Clark et al. ............................. | 280/737 |
| 5,471,932 | 12/1995 | Kraft et al. ............................. | 280/741 |
| 5,725,243 | 3/1998 | Skanberg ................................ | 280/741 |

Primary Examiner—Paul N. Dickson

[57] ABSTRACT

A two-walled, dual chamber, inflator for inflation of an automotive airbag in the event of a collision is provided. The inflator includes a simplified housing with two internal chambers, including a central chamber and a coaxial outer chamber. The central chamber houses both the solid fuel gas generant bodies and a electrical igniter having a reliable single-stage ignition train in direct contact with the generant bed. The single-stage igniter includes a resistance wire submersed in the generant bed along a convoluted path. Multiple points of direct contact are established between the igniter wire and gas generant over a substantial portion of the generant bed, which leads to more uniform and efficient ignition of the gas generant. To get sufficient surface area for the generant to contact the igniter wire, the gas generant bodies are formed in relatively small sizes of about 0.05 inch or less, which, in turn, limits the selection of gas generant materials to those having low burn rates of about 0.625 inch/second or less to be effective. The outer chamber contains a filter for cooling the generated gas and collecting entrained particulate residues prior to venting into the airbag cushion. A one-walled, single chamber, airbag inflator is also provided. The onewalled inflator includes a further simplified housing with only one internal chamber formed inside the outermost wall and no internal side walls dividing the interior into multiple chambers. All components are housed within the single chamber, including the single-stage direct electrical igniter, the small sized gas generant bodies, and the filter which is optional.

12 Claims, 4 Drawing Sheets

FIG. I

AIRBAG INFLATOR WITH DIRECT ELECTRICAL IGNITION FOR SMALL SIZED GAS GENERANT BODIES

FIELD OF THE INVENTION

The present invention relates to gas generators or inflators that produce a gas for rapid inflation of an inflatable vehicle occupant restraint cushion, commonly known as an airbag. More particularly, the present invention relates to a new and improved solid fuel airbag inflator having a simpler, more reliable, and more efficient single-stage direct electrical ignition. The direct ignition makes possible the use of small sized gas generants having low burn rates which are not currently employed in the prior art inflators due to lack of a suitable ignition source. The direct ignition also eliminates the need for having a distinct ignition chamber in the inflator housing, simplifying the inflator construction.

BACKGROUND OF THE INVENTION

An inflatable airbag restraint system is a safety device for protecting automotive vehicle occupants in a collision. In such a system, an airbag is stowed in an uninflated and folded condition in a covered compartment located on the steering wheel or behind the instrument panel. The open mouth of the airbag is situated around gas outlet ports of a gas generator or inflator used to inflate the airbag. In the event of a collision, an on-board crash sensor, detecting the sudden deceleration of the vehicle indicative of the onset of the collision, immediately sends an electric signal to an ignition system located in the inflator. The ignition system fires and initiates combustion of the gas generant also housed in the inflator, which, upon burning, rapidly produces large volumes of high pressure gas which are directed into a filtering and cooling system and vented into the folded airbag. The airbag is caused to expand and deploy in a matter of milliseconds out of its covered compartment into position in front of the vehicle occupants to effectively cushion the occupants against injury-causing impact with interior structures of the vehicle.

The operational requirements of airbag inflators are very demanding. First, the inflator must remain operative for the life of the vehicle. Next, upon activation, the inflator must produce large volumes of relatively cool, non-toxic, and non-corrosive gas in a matter of 30 to 40 milliseconds in order to inflate and deploy the airbag in a timely fashion for effective occupant cushioning. Many forms of driver's side, solid fuel, airbag inflators have been proposed. Recent emphasis on weight reduction has created the need for lighter weight airbag inflators. U.S. Pat. No. 4,547,342 (Adams et al.) and U.S. Pat. No. 4,561,675 (Adams et al.) disclose a few light weight, three-chambered, aluminum inflators which are currently practiced in the art. A similar inflator is shown in U.S. Pat. No. 5,419,578 (Storey et al.).

Typical prior art airbag inflators have a cylindrical housing or canister with three distinct chambers formed inside an outermost wall in the divided spaces created between two inner cylindrical side walls and the outermost wall. In general, there is a central wall between the central ignition system and the encircling solid gas generant material, and another wall spaced outside the central wall between the gas generating material and the encircling filter assembly. The gas produced must flow through ports in both internal walls before passing through diffusion ports in the outermost wall into the airbag. Each ported internal wall and separate chamber adds complexity, size, weight, thermal and fluid flow inefficiencies, and cost to the inflators.

Adding further complexity to the prior art inflators is a typical two-stage ignition system housed inside the central ignition chamber. In the first stage, an electrically activatable squib is used which is filled with a primary igniter charge, for example, powdered $ZrKClO_4$. The squib protrudes in a central ignition chamber from the bottom of the inflator. A pair of leads extend from the squib outside the inflator for connection to the on-board crash sensor circuit. The leads are bridged within the squib by a resistance wire embedded in the primary charge. The second stage uses a igniter cup having a recessed bottom which is filled with a secondary igniter charge, for example, powdered $BKNO_3$, situated on top of the squib. In operation, the electric current sent from the on-board crash sensor is passed into the squib to ignite the primary charge through resistive heating. Upon ignition, the flame and hot gas produced ignites the secondary igniter charge, bursting the cup and releasing flame and hot gas through the ignition chamber ports into the adjoining combustion chamber for ignition of the gas generant and production of the inflation gas for airbag deployment.

Each ignition stage, however, adds complexity and cost to the inflator. Also, the inflator becomes less reliable, since a number of possible ignition failure points exist along the ignition train. For instance, the igniter charges are susceptible to atmospheric moisture during manufacture and inflator assembly and storage. Moisture contamination can alter their ignition and combustion properties, which could lead to a failure in one or both of the ignition stages and cause a catastrophic inflator misfire. Handling by assembly workers of multiple ignition components might also lead to contamination, dangerous premature firing, and faulty assembly.

Another disadvantage of the two-stage ignition system is that it contributes to the generation of undesirable effluents, such as $CO$, $NH_3$ and $NO_x$, resulting from incomplete and inefficient combustion of the gas generant materials. The central location of the ignition system tends to inhibit uniform and efficient combustion of the gas generant bodies within the combustion chamber. This is because the ignition blast must propagate from a limited number of ignition chamber ports radially outward over the entire gas generant bed. Gas generant material located relatively far way from the ignition chamber ports is ignited at a later time than the material located adjacent those ports. When the generant is ignited in stages in this manner, it results in low pressure burning which is undesirable.

Ignition blast propagation problems are ameliorated somewhat when standard sodium azide gas generants pellets are employed. Sodium azide fuels due to their fast burn rates (i.e., about 0.9–1.0 inch per second) need only be pressed into relatively large sized pellets in order to burn out and produce gas within the desired time for effective deployment of the airbag. With the larger sized pellets packed within the combustion chamber, many voids are created in the generant bed which provide channels through which the ignition blast can rapidly travel.

Recently, it has been proposed to use gas generants with slower burn rates than sodium azide fuels. This would allow the selection of a wider variety of gas generants for use in airbag inflators, some of which have advantageous properties over sodium azide, such as lower toxicity and easier disposal. Such generants must be compacted into much smaller sized bodies in order to burn out at quick enough rates to be effective to inflate the airbag in a timely manner. However, upon loading of such bodies in the combustion chamber, they become tightly packed together, creating minimal voids in the chamber. Consequently, the high packing density tends to block the central ignition blast from traveling radially outward throughout the gas generant bed, thereby making it difficult to uniformly ignite the gas generant bodies. This tends to promote stagewise burning, leading to inefficient combustion, increased effluents, and gas production outside the effective time.

A simpler single-stage direct electrical ignition system for an airbag inflator is disclosed in U.S. Pat. No. 3,606,377 (Martin) wherein a resistance wire is axially embedded along the length of an elongated molded body of a solid pyrotechnic gas generant. The opposite ends of the wire extend from the opposite ends of the gas generant body and are connected to the electrical circuit of the vehicle crash sensor. However, there are problems associated with embedding an igniter wire in a gas generant body. The wire may become damaged when molding the gas generant body around the wire which could go unnoticed during inflator assembly. Damage to the igniter wire would prevent the current sent from the crash sensor circuit from being delivered, and in a collision, the igniter wire would fail to ignite the gas generant, resulting in inflator failure and no inflation and deployment of the airbag, which, in turn, could cause catastrophic injury to the vehicle occupant.

What is needed is a simpler airbag inflator containing an improved ignition system which is easier to assemble, simpler in construction, safer, more reliable and more efficient in operation, and which can be used with smaller bodies of low burn rate gas generants.

SUMMARY OF THE INVENTION

It is an object of this invention, therefore, to provide a new and improved airbag inflator and more particularly a new and improved ignition system for an airbag inflator that does not suffer from the foregoing drawbacks.

It is another object of this invention to provide an ignition system for an airbag inflator that is low in cost, easy to assemble, possessed of a minimal number of parts, simple in construction, and safe, reliable and efficient in operation.

Yet another object of this invention is to provide a simple, reliable, and efficient, direct electrical ignition system for an airbag inflator having only a single stage ignition train, which eliminates the need for multiple-stage pyrotechnic ignition systems.

Still another object of this invention is to provide an ignition system for an airbag inflator which establishes multiple points of direct contact with the individual gas generant bodies over a substantial area, to produce a uniform ignition and efficient combustion of the gas generant and reduce the amount of undesirable effluents generated.

And still another object of this invention is to provide an ignition system for an airbag inflator that can be used in an effective manner with smaller sized bodies of slower burning gas generants, eliminating the need for high burn rate gas generant materials.

Still a further object of this invention is to provide an airbag inflator with a low in cost, compact, easier to assemble, and simpler housing construction, resulting from the use of a simpler and more efficient, single-stage, direct electrical ignition system of the aforesaid character.

Yet another object of this invention is to provide an airbag inflator with a simpler housing construction employing a single-stage, direct electrical ignition system of the aforesaid character, which eliminates the need for a distinct ignition chamber and associated ported internal wall between the ignition system and gas generant material, so that direct contact is established between the ignition system and gas generant material.

Still another object of this invention is to provide an airbag inflator with a simpler housing construction employing a single-stage, direct electrical ignition system of the aforesaid character, which eliminates the need for a distinct filter chamber and associated ported internal wall between the gas generant and filter assembly, and also facilitates a reduction in size or elimination altogether of the filter assembly, while still maintaining high efficiency filtering and cooling characteristics, due to more efficient and cleaner burning of the gas generant.

The foregoing and other objects of the present invention are accomplished in one aspect in an airbag inflator having two side walls dividing the interior of a housing into two internal chambers, one for the gas generant and single-stage igniter, and the other for the filter. The first chamber is defined inside a ported internal side wall. The first chamber contains closely packed together small solid bodies of gas generant and an electrically activated single-stage igniter in direct contact with the gas generant bodies. The igniter includes an elongated resistance wire or filament submersed in the gas generant along a convoluted path and spaced apart from the enclosing walls. The opposite ends of the resistance wire or coil include electrical leads connectable outside the housing to a vehicle crash sensor circuit. A second chamber around the first chamber is defined between the peripheral outer side wall and the inner side wall. The second chamber houses a filter for filtering and cooling the generated gas before exiting through diffuser exit ports into the associated airbag.

The foregoing and other objects of the present invention are accomplished in another aspect in an airbag inflator having only one side wall forming a single internal chamber inside a housing for the gas generant, single-stage igniter, and filter. The housing contains only one internal chamber within the peripheral outer side wall. The chamber holds closely packed together small solid bodies of gas generant, an electrically activated single-stage igniter in direct contact with the gas generant, and a filter for filtering and cooling the generated gas prior to exiting diffuser exit ports into the associated airbag. The single-stage igniter is of the aforesaid character. Due to improved combustion efficiencies resulting from the single-stage igniter, a filterless, one-walled, single chamber, inflator is provided in another aspect of the invention, with the single chamber holding only the closely packed together small solid bodies of gas generant and an electrically activated single-stage igniter in direct contact with the gas generant The closely packed together, small sized, solid bodies of gas generant contained in the inflators of the aforesaid character include compositions composed of slow burning or low burn rate gas generants. The low burn rate gas generants are preferably formed by extruding into spherical shapes. The burn rate of these bodies is generally less than about 0.625 inch/second, and, preferably less than about 0.40 inch/second. Typically, the burn rate ranges between about 0.25 and about 0.625 inch/second.

The aforesaid and other objects, features, and advantages of the present invention will become more apparent from the following description and the appended claims.

BRIEF DESCRIPTION OF THE DRAWINGS

With this description of the invention, a detailed description follows with reference being made to the accompanying exemplary drawings which form part of the specification, of which.

DETAILED DESCRIPTION OF THE PREFERRED EMBODIMENTS OF THE INVENTION

Figure 1:
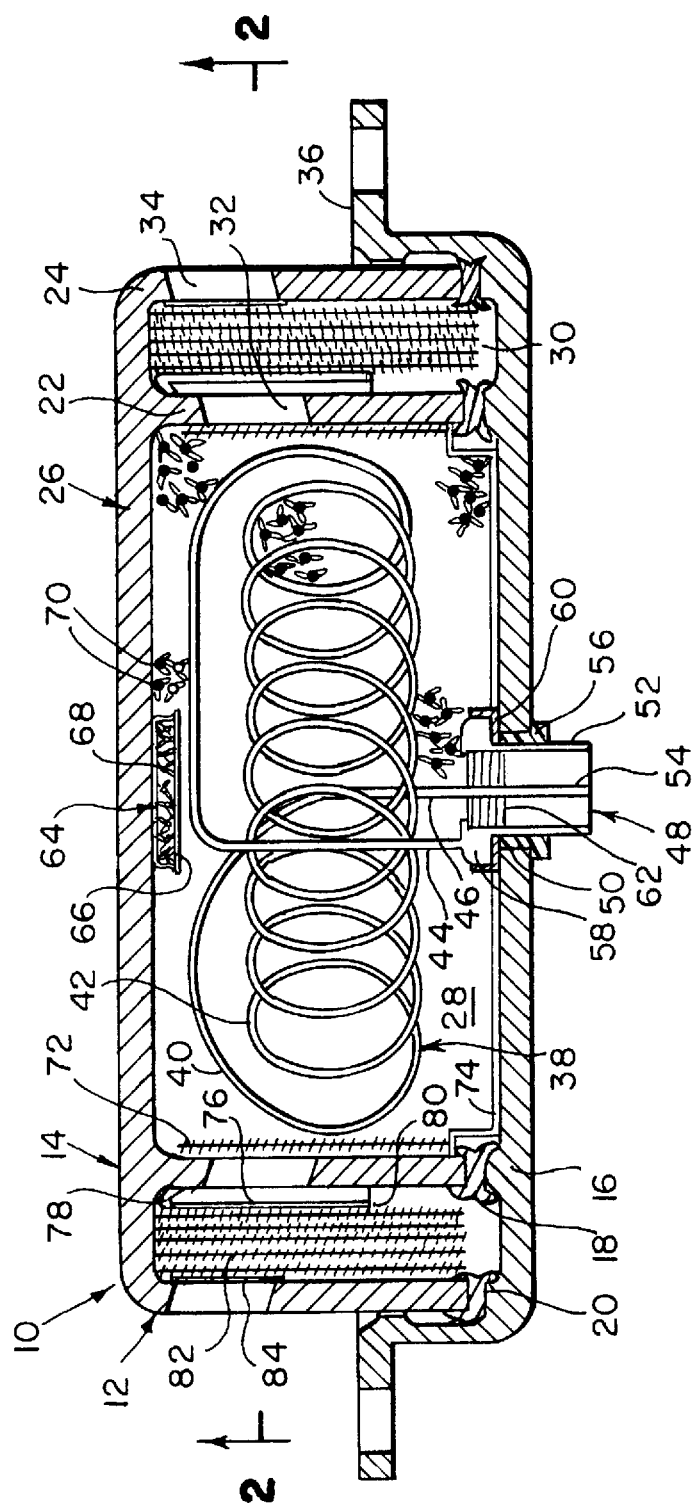
FIG. 1 is a side sectional view of a two-walled, dual chamber, airbag inflator embodying the present invention, but only showing the solid fuel gas generant bodies as being half filled in the inner chamber, for ease of illustration.
Figure 2:
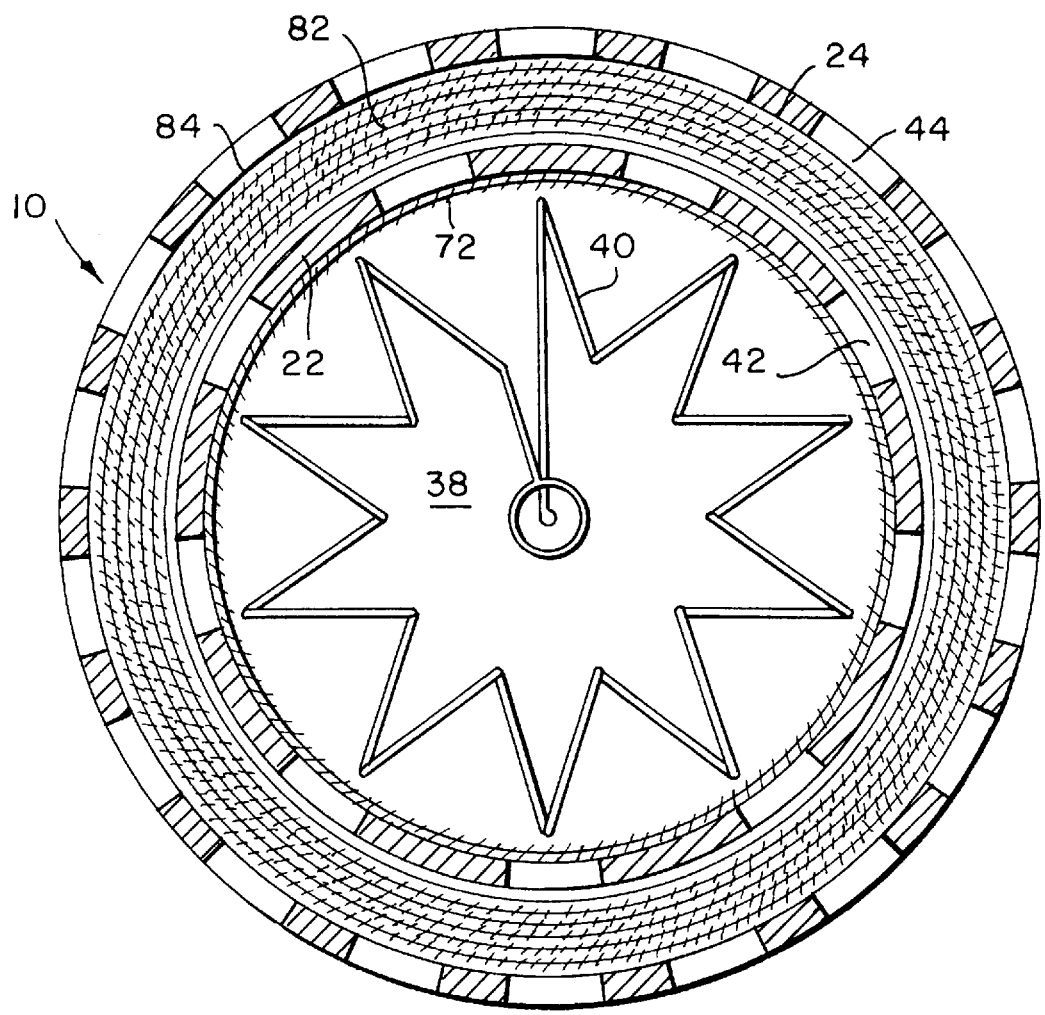
FIG. 2 is a top sectional view of the airbag inflator, taken along lines 2—2 of FIG. 1, but not showing the solid fuel gas generant bodies, for ease of illustration.

A two-walled, dual chamber, gas generator or inflator assembly 10 made in accordance with one embodiment of this invention is shown in FIGS. 1–2. The inflator 10 has a generally cylindrical external outline and includes a housing 12 of, for example, aluminum construction comprising two structural components 14, 16. The two structural components comprise an upper shell or diffuser 14 and a lower shell or base 16 which are joined together by two concentric inertia welds 18, 20.

The diffuser 14 has two concentric cylinders formed by an inner side wall 22 and outer side wall 24, each of which extend downwardly from a common flat upper wall 26 to form a separate weld interface with the base 16. The inner side wall 22, in cooperation with the upper wall 26 and lower base wall 16 forms an inner cylindrical chamber 28, which is otherwise referred to as a combination combustion and ignition chamber. The inner chamber 28 provides a dual function of containing a quantity of solid gas generant material and the direct ignition system used for igniting the gas generant. The outer side wall 24, in cooperation with the side wall of the inner cylinder 22, upper wall 26, and lower base wall 16, forms an outer toroidal chamber 30, which is otherwise referred to as a filter chamber.

The side walls 22, 24 each include a plurality of uniformly spaced exhaust openings or ports 32, 34, the latter, otherwise referred to as diffuser exit ports, through which the inflation gas exits the inflator and flows into an associated vehicle inflatable restraint cushion or airbag (not shown) for inflation. The base 16 includes a peripheral attachment flange 36 which is used to attach the inflator 10 to the interior of a vehicle (not shown) in accordance with well known practices.

As seen in FIGS. 1 and 2, positioned within the combustion and ignition chamber 28 is a single-stage, electrically activatable, direct ignition system 38. The ignition system 38 is mounted directly within the inner chamber 28 containing the solid fuel gas generant, so as to be in direct contact with the gas generant bodies, which eliminates the need for a ported internal wall and distinct ignition chamber, making the inflator housing simpler in construction.

The ignition system 38 includes a single-stage igniter comprising a filament or resistance wire 40 composed, for example, of metal or alloy which is provided in a convoluted path throughout the entire chamber 28. In the embodiment shown, the igniter wire 40 is coiled into regularly spaced, self-supported, rings 42 about the circumference of the chamber 28. Each ring 42 stands upright, being oriented in an axial direction, and extends radially outward from the center towards the inner side wall 22, so as to distribute the igniter wire over a substantial area throughout the chamber 28. Each ring 42 is also slightly spaced from the inner side wall 22, lower base wall 16, and upper diffuser wall 26, so as to avoid direct electrical contact and possible shorting. It should be understood, however, that the igniter wire 40 may take on a variety of convoluted configurations, including single or multi-looped, coiled, spirally wound, helically wound, or otherwise.

When energized with a sufficient amount of electrical current from the crash sensor circuit, the igniter wire 40 is caused to resistively heat to the ignition temperature of the solid fuel gas generant and, in a single-stage, directly ignite the gas generant bodies in contact therewith. Once ignition occurs, the combustion of the gas generant progresses swiftly through the generant bed to produce the airbag inflation gas.

The igniter wire 40 is energized through a pair of electrical leads 44, 46 formed at the opposite ends of the wire. The leads 44, 46 are electrically connected to a coaxial connector 48 adapted for plug-in connection to an on-board crash sensor circuit (not shown). As shown in FIG. 1, the coaxial connector 48 is sealingly mounted in the combustion and ignition chamber 28 through a central opening 50 formed in the lower base wall 16. The coaxial connector 48 includes an outer conductive metal tube 52 and an inner coaxial lead wire 54. The outer tube 52 is surrounded in the bottom opening 50 by a dielectric plastic sleeve 56, so as to prevent electrical contact with the lower base wall 16. The outer tube 52 is secured within the opening 50 with an enlarged conductive retainer ring 58. An annular rubber washer 60 is sandwiched between the retainer ring 58 and inside of the lower base wall 16 to seal the opening 50 and separate the retainer ring 58 from electrical contact with the base wall 16. One electric lead 44 formed on the end of the igniter wire 40 is electrically connected by suitable means, such as soldering, to the retainer ring 58 to establish electrical communication with the outer tube 52. The other lead 46 extends through the center of the outer tube 52 forming the coaxial lead 54. Lead 54 is electrically isolated from the outer tube 52 with an annular dielectric plastic cap 62 closing and sealing the upper end of the tube 52. It should be understood that other common electrical connectors can also be used in accordance with this invention.

As further shown in FIG. 1, also positioned within the combustion and ignition chamber 28 is an autoignition device 64 mounted against the inside of the upper diffuser wall 26 just above the igniter wire 40. The autoignition device 64 includes a autoignition cup 66 filled with an autoignition material 68, such as IMR sold by DuPont. The autoignition device is a commonly used safety feature for the inflator assembly 10, which activates the inflator in case of exposure to abnormal elevated temperatures substantially higher than the normal ambient range, but substantially lower than the ignition temperature of the gas generant in the inflator.

Referring still to FIG. 1, relatively small sized bodies of a solid fuel gas generant material 70 are packed uniformly in the combustion and ignition chamber 28 in suitable amounts sufficient to inflate the airbag. Although the gas generant material 70 is shown in FIG. 1 as only filling the right side of chamber 28 for ease of illustration, in practice, the gas generant 70 substantially fills the entire chamber 28. The igniter wire 40 is submersed, rather than embedded, in the gas generant 70, with the wire extending in a convoluted path over a substantial portion of the chamber 28. Since the igniter wire 40 is not separately confined within ported side walls of a central ignition chamber as commonly employed in prior art inflators, multiple points of direct contact are established between the igniter wire 40 and the individual gas generant bodies 70 in proximity to the wire. Each point of contact is a primary source of ignition for the gas generant. The multiple contacts produce more efficient, more uniform, and more reproducible ignition of the closely packed generant bed.

The single-stage, direct electrical ignition system 38 works best with small sized gas generant bodies in order to get sufficient surface area to contact the igniter wire 40. The small sized gas generant bodies 70 found most suitable for use in this invention are formed as solid or hollow spheroids. In order to get sufficient surface area for the spherical generants to contact the igniter wire 40, the particle size generally ranges from about 0.05 inch in diameter or less, preferably about 0.032 inch or less, and typically between about 0.02 and about 0.05 inch. This sizing, in turn, limits the selection of the gas generant materials to compositions with relatively low burn rates, generally ranging from about 0.625 inch/second or less, and, preferably from about 0.4 inch/second or less, and typically between about 0.25 and about 0.625 inch/second. The aforesaid parameters allow the gas generant particles to burn out and produce gas within the time necessary to be effective to deploy the airbag in a timely fashion, that is, within about 30–40 milliseconds.

Due to their relatively small size and high surface area, multiple direct ignition points are established between the gas generant materials 70 and the igniter wire 40. Consequently, the combustion of the gas generant progresses very swiftly throughout the entire generant bed despite their relatively low burn rates. This results in a much more uniform, controllable, reproducible, and efficient ignition which could not be accomplished in prior art airbag inflators with central ignition systems due to a lack of a suitable ignition source. More uniform, efficient and complete combustion of the gas generant bed, in turn, reduces the generation of undesirable effluents, eases the filtering requirements, and further improves the inflator ballistics.

A wide selection of suitable low burn rate gas generant materials exist which meet flame temperature, stability, filterability, toxicity, corrosivity, and gas generation requirements. Examples of suitable low burn rate, non-azide, gas generant compositions include, without limitation, mixtures of combustible fuels composed of nitrate salts of amines or urea, such as cobalt hexamine trinitrate, and oxidants composed of metal oxide compounds. Examples of suitable nitrate salts of amines or urea include, without limitation, ethylenediamine dinitrate, guanidine nitrate, urea nitrate, and semicarbazide nitrate, and combinations thereof, or the like. Examples of suitable metal oxidizers for combustion include, without limitation, copper (II) oxide, copper (II) trihydroxy nitrate (or basic copper (II) nitrate), and strontium nitrate, or mixtures, and the like.

Examples of preferred low burn rate mixtures include about 48 wt. % basic copper (II) nitrate and about 42 wt. % guanidine nitrate or about 59 wt. % basic copper (II) nitrate, about 41 wt. % guanidine nitrate, and about 5 wt. % guar gum. It is particularly useful to add a binder, such as a soluble polysaccharide, for example, guar gum, to improve formability. Reference can be made to U.S. Pat. No. 5,608,183 (Barnes et al.) drawn to gas generants containing amine nitrates plus basic copper (II) nitrate and/or cobalt (III) triammine trinitrate, for a further description of other suitable low burn rate, non-azide compositions, which disclosure is incorporated by reference herein in its entirety. Other low burn rate compositions suitable for use as gas generants for airbag inflators which meet flame temperature, stability, filterability, toxicity, corrosivity, and gas generation requirements will be apparent to those skilled in the art.

The low burn rate generants 70 are preferably formed by extrusion spheronization. The extrusion spheronization method generally involves: 1) forming a slurry of generant ingredients with water; 2) extruding the slurry to form spaghetti-like cylindrical rods; and, 3) chopping and spheronizing the rods into spheroids. Reference can be made to U.S. Pat. No. 4,994,212 (Vos et al.) and U.S. Pat. No. 5,084,218 (Vos et al.) for a further description of extrusion spheronization techniques, which disclosures are incorporated by reference herein in their entireties. Powdered generants can also be used in this invention.

Referring again to FIGS. 1 and 2, the gas generant bodies 70 are surrounded by an annular inner screen or filter pack 72. As best seen in FIG. 1, the inner filter pack 72 may include a layer of coarse screen which is disposed adjacent to the inside of side wall 22 across the outlet ports 32. To facilitate inflator assembly, an annular retainer disk 74 is mounted across the lower end of combustion and ignition chamber 28 in spring loaded engagement with the inside of the inner side wall 22. The retainer disk 74 is used to retain the gas generant 70 and inner filter 72 in place and away from the lower base wall 36 during, for example, inertia welding, which is performed in a wholly loaded condition.

Moving radially outward, the outer filter chamber 30 contains an annular deflector ring 76 which is mounted in press fit engagement against the outside of the inner side wall 22 across the outlet ports 32. The deflector ring 76 is formed with an inwardly directed curved flange 78 at its upper end and extends downwardly from its upper end to provide exhaust openings 80 adjacent its lower end. Also included in the filter chamber 30 is an annular outer screen or filter pack 82. The filter pack 82 is located between the deflector ring 76 and the inside of the outer side wall 24 across the diffuser exit ports 34. Filter 82 can include superimposed layers of coarse screens and/or fine screens and/or ceramic filter papers.

An annular frangible foil seal 84 is also positioned in the outer filter chamber 30 against the inside of the outer side wall 24 to cover the diffuser exit ports 34. The foil seal 84 hermetically seals the inflator housing 12 against atmospheric moisture and other contaminants. However, once the inflator is activated, the foil seal 84 is designed to rupture against the pressure of generated gas evolved during inflator operation.

In operation during a vehicle collision, an electric signal from an on-board crash sensor is immediately sent to the direct ignition system 38. Electric current rapidly builds up in the igniter wire 40 and resistively heats the igniter wire to the ignition temperature of the gas generant 70. The gas generant bodies 70 in direct contact with the igniter wire 40 are then caused to ignite. Upon ignition, due to their small size and high surface area, the combustion progresses swiftly through the gas generant bed, producing large volumes of inflation gas in the inner chamber 28. The inflation gas is directed to pass through the inner filter pack 72 for cooling and removal of entrained solid combustion residues, and then radially outward through the inner chamber ports 32. As the inflation gas exits the combustion and ignition chamber 28 into the filter chamber 30, the gas flow is first turned downwardly by deflector ring 76 and then caused to flow through its lower opening 80 into the outer filter pack 82. The outer filter pack 82 further cools the exhausting gas and removes any remaining particulate matter. Finally, the inflation gas flows radially outward from the filter 82 towards the diffuser exit ports 34. As the pressure builds up behind the foil seal 84 to a predetermined threshold value, the foil seal 84 is caused to rupture, opening the sealed diffuser exit ports 34. The inflation gas then rushes through the diffuser ports 34 into the open mouth of the associated airbag cushion for rapid deployment.

Figure 3:
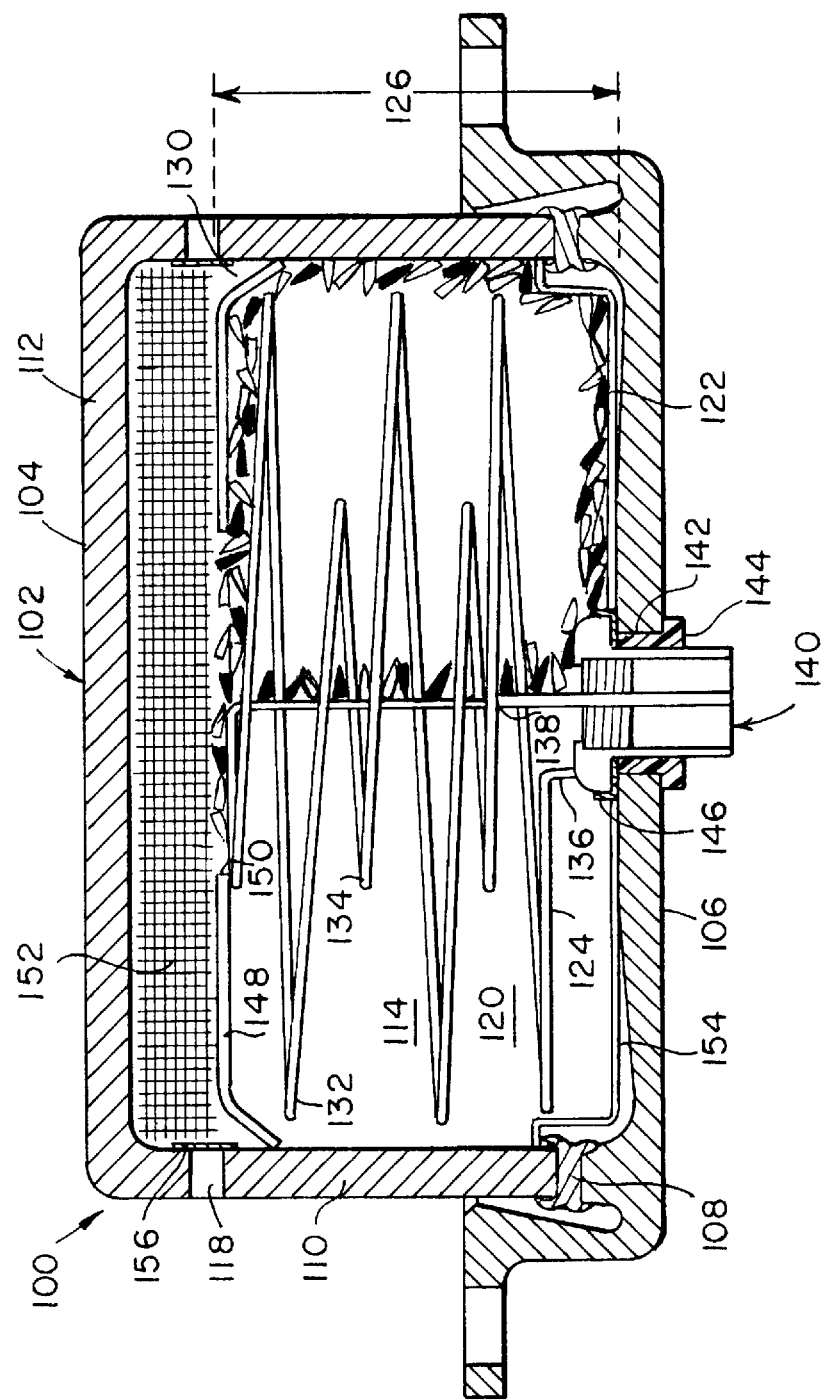
FIG. 3 is a side sectional view of a one-walled, single chamber, airbag inflator embodying another embodiment of the present invention, but only showing the solid fuel gas generant bodies as being half filled in the single chamber, for ease of illustration; and, FIG. 4 is a side sectional view of a filterless, one-walled, single chamber, airbag inflator embodying a further embodiment of the present invention.

Referring now to FIG. 3, a one-walled, single chamber, inflator assembly 100 made in accordance with another embodiment of this invention is shown. The inflator 100 has a generally cylindrical housing 102 which includes upper diffuser 104 and lower base 106 are joined together at weld 108. The diffuser 104 consists of a single cylinder defined by outer peripheral side wall 110 which extends downwardly from a flat upper wall 112. The cylindrical side wall 110, in cooperation with the upper wall 112 and the base 106 forms a single internal chamber 114. The housing 102 contains no ported internal side walls dividing the interior into separate chambers. The single outer side wall 110 contains a plurality of spaced diffuser ports 118 to vent the inflation gas into the airbag.

Positioned within the internal chamber 114 is a single-stage, direct electric ignition system 120. The direct ignition system is placed in direct contact with the solid fuel gas generant 122, which eliminates the need for a distinct ignition chamber. The ignition system 120 includes a single-stage igniter composed of a filament or resistance wire 124. The igniter wire 124 is disposed in a convoluted path within a selected lower portion 126 of the single chamber 114 in which the gas generant bodies 122 are housed. In the embodiment shown, the selected lower portion 126 extends upwardly from the lower base wall 106 to a distance spaced from the upper diffuser wall 112, leaving an open area in an upper portion 130 of the chamber 114 adjacent the diffuser ports 118. The igniter wire 124 is spirally wound about the center of the chamber 110 forming alternating, spaced apart, large and small generally horizontal rings 132, 134. The rings extend radially outward towards the outer side wall 110 and axially upward from adjacent the lower base wall 106 to the upper end of the lower chamber portion 126. The igniter wire 124 is spaced from the side wall 110, lower base wall 106, and upper diffuser wall 112 to prevent electrical contact and possible shorting.

The opposite ends of the igniter wire 124 terminate in a pair of electrical leads 136, 138 which are electrically connected to a coaxial connector 140 adapted to plug-in to an on-board crash sensor circuit (not shown) in the vehicle. The coaxial connector 140 is mounted in the chamber 114 through a central opening 142 formed in the lower base wall 106 with a dielectric sleeve 144 and is sealed therein with an annular washer 146.

Also disposed within the selected lower portion 126 of the chamber 114 are the relatively small sized bodies of low burn rate gas generant materials 122 of the aforesaid character. Although the gas generant bodies 122 are shown in FIG. 3 as only filling the right half of the lower portion 126 of the chamber 114, in practice, the gas generant bodies 122 are filled within the entire lower portion 126. The self-supported igniter wire 124 is submersed, rather than embedded, in the gas generant bodies 122, with the wire extending through a convoluted path over a substantial area of the lower portion 126.

An annular deflector ring 148 is mounted to the inside of side wall 110 just below the diffuser exit ports 118. The deflector ring 148 has a central opening 150 for passage of the generated inflation gas. A circular screen or filter pack 152 is disposed in the upper portion 130 above the deflector ring 148. The filter pack 152 can be made of a minimal volume, yet still maintain desired filtering and cooling characteristics, due to the more efficient and cleaner burns of the gas generant 122 produced with the direct ignition system 120. The filter pack 1 52 may include superimposed layers of coarse screens and/or fine screens and/or ceramic filter papers. The filter pack 152 in this embodiment is housed directly within the same chamber holding the ignition system 120 and the gas generant 122, eliminating the need for a separate filter chamber and associated ported internal dividing wall, making the inflator much simpler in construction, while also improving the filtering through tortuous and diffuse gas flow.

To facilitate inflator assembly, an annular retainer disk 154 is mounted across the lower end of the chamber 114 in snap fit engagement against the inside of the side wall 110 to retain the gas generant bodies 122 in place and away from the lower base wall 106 during, for example, inertia welding, which is performed in a wholly loaded condition. A frangible foil seal 156 is adhesively positioned over the diffuser exit ports 118 to hermetically seal the inflator 100 before activation.

Figure 4:
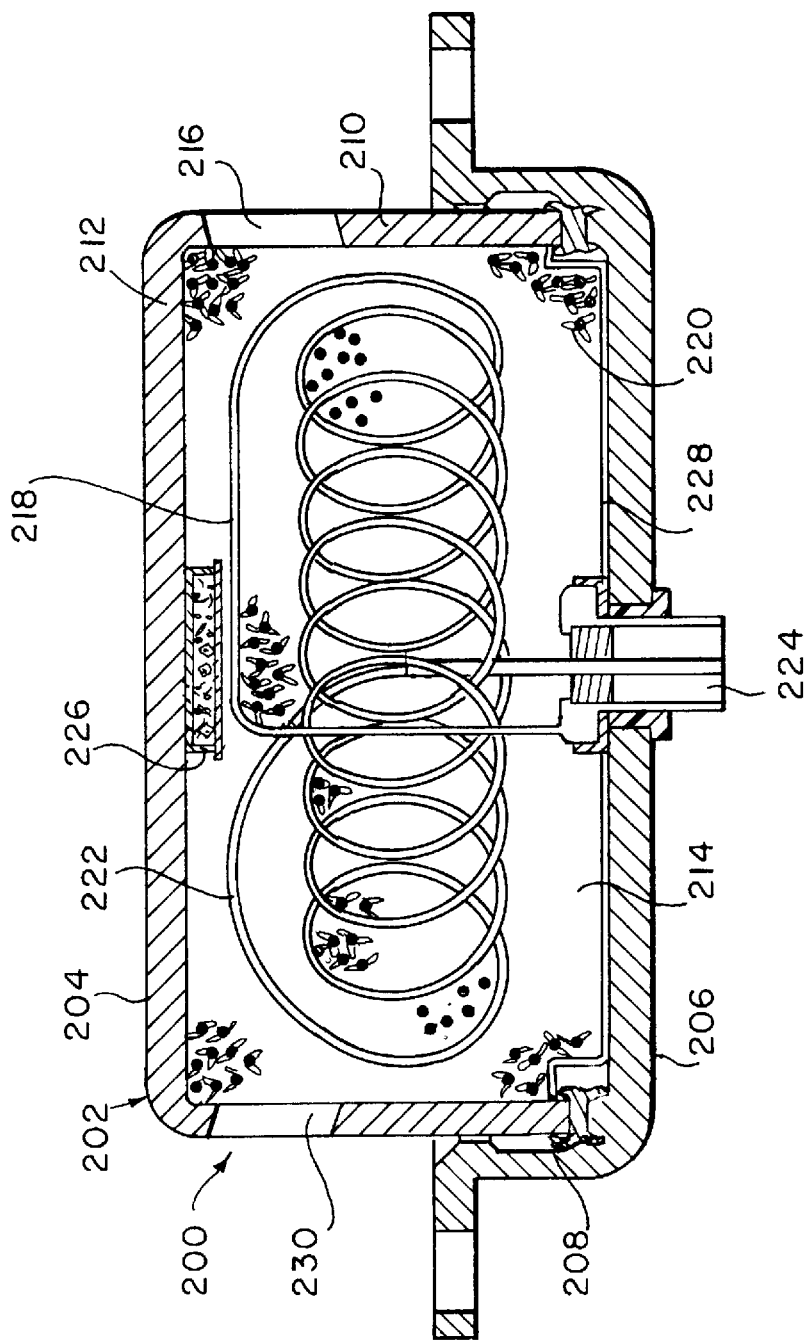

Referring now to FIG. 4, a filterless, one-walled, single chamber, inflator assembly 200 made in accordance with a further embodiment of this invention is shown. The inflator 200 has a generally cylindrical housing 202 which includes upper diffuser 204 and lower base 206 which are joined together at weld 208. The diffuser 204 forms a single annular cylinder defined by peripheral outer side wall 210 which extends downwardly from a flat upper wall 212. The cylindrical side wall 210, in cooperation with the upper wall 212 and the lower base wall 206 forms a single internal chamber 214. No ported internal side walls are formed within the housing so as to divide the housing into multiple chambers. The outer side wall 210 includes a plurality of diffuser ports 216 to vent the inflation gas from the inflator into the airbag.

Positioned within the single internal chamber 214 is a single-stage, direct electric ignition system 218. The direct ignition system 218 is placed in direct contact with the solid fuel gas generant 222, eliminating the need for a distinct ignition chamber, making the inflator simpler in construction. The ignition system 218 includes a single-stage, self-supporting, igniter wire 222 coiled throughout the chamber 214. The opposite ends of the igniter wire 222 terminate in a pair of leads connected to a coaxial connector 224 adapted for plug-in connection to the on-board crash sensor circuit (not shown) in the vehicle. Due to the improved efficiency of the direct ignition system and resultant cleaner combustion of the gas generant materials, a filter is not required in this embodiment, eliminating the need for a distinct filter chamber and associated dividing ported internal wall, further simplifying the inflator construction, while still maintaining desired filtering and cooling characteristics.

Also disposed within the single chamber 214 are the relatively small sized bodies of low burn rate gas generant materials 220 of the aforesaid character. The self-supported igniter wire 222 is submersed, rather than embedded, in the gas generant bodies 220, with the wire extending through a convoluted path over a substantial area of the generant bed.

An autoignition device 226 is positioned against the inside of the top wall 212 as a safety feature. To facilitate inflator assembly, an annular retainer disk 228 is mounted across the lower end of the chamber 214 in snap fit engagement against the inside of the side wall 210, to retain the internal components of the inflator in place when the diffuser 204 and base 206 are joined together in a wholly loaded condition. A frangible foil seal 230 is secured against the inside of the side wall 210 across the diffuser exit ports 216 to hermetically seal the inflator 200 before activation.

The invention having been disclosed in the foregoing embodiments, other variations of the invention will be apparent to persons skilled in the art. The invention is not intended to be limited to the embodiments disclosed, which are considered to be purely exemplary. Accordingly, reference should be made to the appended claims to assess the true spirit and scope of the invention, in which exclusive rights are claimed.

What is claimed is:

1. A two-walled inflator for rapid generation of gas for inflating an airbag cushion, comprising:

a cylindrical housing including an outer peripheral side wall having a plurality of spaced apart diffuser exit ports for directing gas outwardly to inflate said airbag, a circular top wall and a spaced apart circular bottom wall joined to said outer side wall;

said housing further including a single, inner cylindrical side wall extending between said top and bottom wall spaced inside said outer side wall and in coaxial relation therewith, said inner side wall having a plurality of spaced apart outlet ports therein for directing gas outwardly towards said outer side wall;

a first chamber within said inner side wall, said first chamber containing a gas generant comprising a plurality of solid bodies adapted to be ignited for generating gas to inflate said airbag, and an electrically activated igniter with a single stage ignition train in direct contact with said gas generant for igniting said gas generant, said igniter including an elongated resistance wire submersed in said gas generant along a convoluted path and spaced apart from said inner side wall, top wall, and bottom wall, said resistance wire having opposite ends including electrical leads connectable outside said housing to a vehicle crash sensor circuit; and, a second chamber defined between said inner side wall and said outer side wall, said second chamber containing an annular filter for filtering and cooling said gas flowing outwardly from said outlet ports of said first chamber through said second chamber before being delivered through said diffuser exit ports into said airbag.

2. The inflator of claim 1, wherein:

said resistance wire of said igniter is disposed in a coil, loop, spiral, or helical path within said first chamber.

3. The inflator of claim 2, wherein:

said gas generant bodies are generally spherical in shape having a particle size up to 0.05 inch in diameter.

4. The inflator of claim 3, wherein:

said gas generant is a low burn rate material having a burn rate up to 0.625 inch/second.

5. The inflator of claim 4, wherein:

a frangible foil seal is secured over said diffuser exit ports for sealing said housing prior to inflator activation.

6. A one-walled airbag inflator for rapid generation of inflation gas for inflating an airbag, comprising:

a cylindrical housing including an outer peripheral side wall with a plurality of spaced apart diffuser exit ports therein for directing gas outwardly to inflate said airbag, a circular top wall and a spaced apart circular bottom wall joined respectively to said outer side wall;

a gas generant contained in a single chamber formed inside said outer peripheral side wall, said gas generant comprising a plurality of solid bodies adapted to be ignited for generating gas to inflate said airbag; and, an electrically activated igniter with a single stage ignition train contained in said single chamber in direct contact with said gas generant for igniting said gas generant, said igniter comprising an elongated resistance wire submersed in said gas generant along a convoluted path and spaced apart from said side wall, top wall, and said bottom wall, with opposite ends of said resistance wire including electrical leads connectable outside said housing to a vehicle crash sensor circuit.

7. The inflator of claim 6, wherein:

a filter is disposed within said single chamber for filtering and cooling said generated gas before being delivered through said diffuser exit ports into said airbag.

8. The inflator of claim 7, wherein:

said single chamber includes a lower portion containing said gas generant and igniter, and an upper portion holding said filter of cylindrical shape, said lower portion being in flow communication with said upper portion, and said upper portion being in flow communication with said diffuser exit ports.

9. The inflator of claim 6, wherein:

said resistance wire of said igniter is disposed in a coil, loop, spiral, or helical path within said single chamber.

10. The inflator of claim 9, wherein:

said gas generant bodies are generally spherical in shape having a particle size up to 0.05 inch in diameter.

11. The inflator of claim 10, wherein:

said gas generant is a low burn rate material having a burn rate up to 0.625 inch/second.

12. The inflator of claim 11, wherein:

a frangible foil seal is secured over said diffuser exit ports for sealing said housing prior to inflator activation.

* * * * *